United States Patent

Huang et al.

[11] Patent Number: 6,131,134
[45] Date of Patent: Oct. 10, 2000

[54] HOT PLUG-AND-PLAY CONVERTER OF A UNIVERSAL SERIAL BUS INTERFACE

[75] Inventors: Yi-Chen Huang, Hsin-Tien; Ming-Shang Chen, Taipei Hsien, both of Taiwan

[73] Assignee: Primax Electronics Ltd., Taipei Hsien, Taiwan

[21] Appl. No.: 09/123,569

[22] Filed: Jul. 27, 1998

[30] Foreign Application Priority Data

May 12, 1998 [TW] Taiwan ................................. 87107279

[51] Int. Cl.[7] ..................................... G06F 13/00
[52] U.S. Cl. .................... 710/103; 710/102; 710/129; 710/63; 710/62
[58] Field of Search ..................... 710/103, 102, 710/101, 100, 129, 131, 62, 63, 64, 126; 326/37, 41, 39; 379/93.05

[56] References Cited

U.S. PATENT DOCUMENTS 5,935,224  8/1999  Svancarek et al. .................. 710/63
5,958,027  9/1999  Gulick .................................. 710/52
5,987,530  11/1999 Thomson ............................. 710/4
6,009,480  12/1999 Pleso .................................. 710/8

*Primary Examiner*—Ario Etienne
*Attorney, Agent, or Firm*—Christie, Parker & Hale, LLP

[57] ABSTRACT

A hot plug-and-play (PnP) converter of a universal serial bus (USB) interface that converts a non-PnP interface into a hot PnP USB interface. The converter sends the information related to the converter itself to the connected computer system, and sends the information related to the connected peripheral as well as to the presence of the peripheral to the computer system. Users can handle the connection status of disclosed is a connected peripheral more directly. The converter further instructs the computer system to detect the connection status of a peripheral automatically by changing the connection of the pull-up resistor of the transferring wire on the USB interface.

8 Claims, 5 Drawing Sheets

HOT PLUG-AND-PLAY CONVERTER OF A UNIVERSAL SERIAL BUS INTERFACE

CROSS-REFERENCE TO RELATED APPLICATION

This application claims the priority benefit of Taiwan application serial no. 87107279, filed May 12, 1998, the full disclosure of which is incorporated herein by reference.

BACKGROUND OF THE INVENTION

1. Field of the Invention

The invention relates to a converter linking different interfaces, and more particularly, to a converter of a universal serial bus (USB) interface that converts legacy peripherals into hot plug-and-play (hot PnP) peripherals.

2. Description of Related Art

Every since the XT and the later AT personal computers were developed by IBM®, IBM®-compatible personal computers have been widely used worldwide. In accordance with the advancement of semiconductor technique, usage of a personal computer is more powerful than ever, and the number of peripherals available for a personal computer has increased as well. Examples of peripherals used with personal computers include a mouse, required because of the popularity of graphic user interface, a printer for printing out information, a modem for connecting to the internet, a backup system of a huge capacity to store data periodically in order to prevent data, and a scanner to save graphics into a personal computer. Since each of the foregoing devices is developed independently at different points in time for different purposes, the interfaces used are different with respect to different considerations. Presently every personal computer is equipped with a number of different interfaces so that different peripherals can be used. Some of those equipped interfaces are already set as industrial standards, such as the RS232 serial interface for a mouse and the parallel port for a printer. On the other hand, some of those interfaces also require installation of interface cards, such as the small computer system interface (SCSI) used by most huge-capacity backup devices. Some of the interfaces for a personal computer further require special interfaces, such as the interfaces used by scanners. As a result, each personal computer contains a number of slots for the installation of different interfaces, that makes the cabling and connections of a personal computer and the attached peripherals very messy and complicated.

In view of the foregoing situation, a standard USB interface is then developed, so that all peripherals designed for a personal computer can be connected through a unique interface to simplify the installation of a personal computer system. The reserved space within a personal computer used for the installation of different interface cards is also reduced. The USB interface is plug-and-play, so it can further detect the attached devices and install required drivers for the detected devices.

When a legacy device is installed into a conventional personal computer that uses legacy peripherals. the system must be rebooted as the final step of the entire installation after setting up the newly installed device. When a legacy device is removed, the system cannot automatically detect the absence of the removed device, so the system gives error messages, or even locks up at the moment when the system is trying to execute a program related to the removed device. However, when the system includes a function of hot plug-and-play using the USB interface, the system can automatically detect newly added or removed devices, and then install or uninstall needed drivers and related programs without rebooting the system.

Although employing the USB interface provides a number of advantages, some peripherals are still connected through old-type interfaces, which predate the USB interface. In order to connect those peripherals, which use old interfaces other than the USB interface, to a personal computer through USB interface, a converter is then developed according to the needs.

A PnP peripheral has to have an internal pull-up resistor to be connected to the signal line of the USB interface. When a peripheral is connected to a personal computer through a USB interface the pull-up resistor within the peripheral changes the voltage level on the signal line of the USB interface to instruct the system to start the detection of new devices. As the detection of new device starts, the system first sends out some requests, and devices respond with corresponding descriptors so that the system is able to recognize the present devices, and accomplishes the PnP task. Because the initializations of some peripherals are not finished, or the electrical interfaces are not stabilized while receiving the requests from the system, the requests from the system then cannot be processed correctly. Therefore, the pull-up resistor within a peripheral is preferably connected to the USB interface after the peripheral is initialized and stabilized to reduce the occurrence of detecting errors.

Although some existing converters allow the peripherals using old interfaces to be connected to a personal computer through a USB interface, the functions of those conventional converters are limited. Those conventional converters can only convert the old interfaces of the peripherals to USB interface and send information about the converter to the system, but cannot send information about the connected peripherals. In addition, a conventional converter cannot accomplish the hot PnP task, either, so the user has no information about the status of the connected peripherals that might cause errors during the execution of related programs. Though the problem can be corrected by employing the rolling method of the software simulation, it lowers the efficiency of the system and wastes system resources. This conventional method is not only against the true spirit of PnP, but also causes compatibility problems.

According to the foregoing description, a conventional USB converter has the following drawbacks:

1. A conventional USB converter can only convert the information transferred between interfaces, so the system can obtain the information about the converter but not about the connected peripheral.

2. A conventional USB converter cannot accomplish the hot PnP task, so the system cannot automatically detect the connection status of the peripheral and the system. The system might malfunction due to improper uses such as when a user tries to execute a program on a peripheral, which is not connected to the system. Even though a software simulation can improve the described problems, it affects the efficiency of the system and further might cause compatibility problems.

SUMMARY OF THE INVENTION

It is therefore an objective of the present invention to provide a USB converter working between an old interface and a USB interface. The system can have the information about the converter, and also the information about the connected peripheral, so that a user can obtain information about the exact status of the connected peripheral.

It is another object of the present invention to provide a USB converter working between an old interface and a USB interface, to enable the hot PnP function on the system. The converter according to the invention makes the system automatically detect the connected peripheral by changing the connection of the pull-up resistor on the UBS interface signal line, then the converter sends proper information about the connected peripheral to the system.

In accordance with the foregoing and other objectives of the present invention, the invention provides a hot PnP USB converter to convert a non-PnP interface to a PnP USB interface, and allow a peripheral using a non-PnP interface to be connected to a personal computer through a USB interface. The USB interface includes a first transferring wire, and the converter includes a switch, a resistor, and a converting circuit.

The converting circuit converts the transferred signals between a non-PnP interface and a USB interface, and controls the opening and closing of the switch through a switch-controlling signal. In addition, the resistor is used as a pull-up resistor, which is connected to the first transferring wire at one end and to the positive voltage source through the switch at the other end.

The initially closed switch in the converter is opened for a very short period of time and then closed again by the control of a switch-controlling signal from the converting circuit after a non-PnP peripheral is connected to the converter. The change on the switch makes the system automatically detect the attached peripheral.

When a connected peripheral is disconnected from the converter, the converting circuit opens the switch for a short period of time and then closes the switch again by a controlling signal.

According to a preferred embodiment of the invention, a USB interface further includes a second transferring wire, which is a complement of the first transferring wire. The first transferring wire is used to detect if a high-speed peripheral is connected, and the second transferring wire is used to detect a connected low-speed peripheral. The positive voltage source connected to the pull-up resistor has a voltage potential of 3.3 volts.

The USB converter according to the invention further includes a device database storing information from the peripherals, so, when the converting circuit detects that a non-PnP peripheral is connected to the system, the information related to the connected non-PnP peripheral can be found.

The foregoing hot PnP USB converter is controlled in the following manner:

providing a non-PnP interface for the purpose of connecting to a peripheral;
   Providing a PnP USB interface for the purpose of connecting to a personal computer system, wherein the USB interface includes a first transferring wire;
      the purpose of pulling up the first transferring wire to a positive voltage source;
      performing a first-stage setup, sending the information of the converter to the system;
      checking the non-PnP interface, wherein the checking task is repeated until a connected peripheral is found;
      determining the model and type of the connected peripheral;
      opening the connection between the resistor and the first transferring wire for a period of time and then closing it;
      performing a second-stage setup, sending the information of the connected peripheral to the system;
      performing a main loop which includes:
      checking the connection of the peripheral and the non-PnP interface;
      if the connection between the peripheral and the non-PnP interface no longer exists, opening the connection between the resistor and the first transferring wire for a period of time and then closing, and after that then performing the first-stage setup again;
      if the connection between the peripheral and the non-PnP interface still exists, transferring the commands from the system to the peripheral; and
   returning to the main loop, and transferring other commands.

The sequence of events described above is a controlling routine of a two-stage setup used in a hot PnP USB converter. The following is the controlling routine of an advanced setup, which includes:

providing a non-PnP interface, for connecting to a peripheral;
   providing a PnP USB interface, for connecting to a personal computer system, wherein the USB interface includes a first transferring wire;
   providing a resistor, for pulling up the first transferring wire to a positive voltage source;
   performing a first-time determination on the existence of the connection between the non-PnP interface and the peripheral;
   if the connection between the non-PnP interface and the peripheral doesn't exist, performing a first-stage setup, sending the information of the converter to the system;
   performing a second-time determination on the existence of the connection between the non-PnP interface and the peripheral;
   if the connection between the non-PnP interface and the peripheral doesn't exist, repeating performance of the second-time determination until the connection between the non-PnP interface and the peripheral exists;
   in the case that either the first-time determination or the second-time determination reports the existence of the connection between the non-PnP interface and the peripheral, performing the following:
      determining the model and type of the connected peripheral;
      opening the connection between the resistor and the first transferring wire for a period of time and then closing it;
      performing a second-stage setup, sending the information of the connected peripheral to the system;
      performing a main loop, which includes:
         checking the connection of the peripheral and the non-PnP interface;
         if the connection between the peripheral and the non-PnP interface no longer exists, opening the connection between the resistor and the first transferring wire for a period of time and then closing, and after that then performing the first-time determination again;
         if the connection between the peripheral and the non-PnP interface still exists, transferring the commands from the system to the peripheral; and
      returning to the main loop, and transferring other commands.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
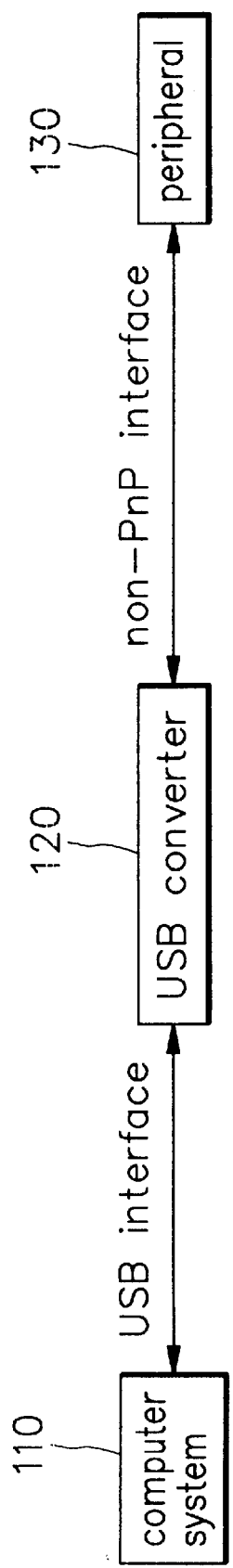
FIG. 1 is a schematic block diagram showing the connections between the USB converter of the invention, a personal computer, and a peripheral.

The invention provides a new USB interface converter to connect a non-PnP legacy peripheral to the USB interface of a personal computer. Conventionally, a legacy device, a non-PnP peripheral having no USB interfaces, can only be connected to a computer system through interfaces, such as parallel interface, SCSI interface, or serial interface. Referring to FIG. 1, the non-PnP interface of the peripheral 130 is turned into a hot PnP USB interface by connecting it to the USB converter 120. The computer system 110, which is able to detect a PnP peripheral connected to the USB interface, immediately detects the existence of the legacy peripheral 130 connected to the computer system 110 through the USB converter 120, and defines the type of the legacy peripheral. The computer system 110 then selects proper drivers and programs to control the connected peripheral 130, so users can use the connected peripheral 130 through the control of the computer system 110. Similarly, the computer system 110 detects the absence of the connected peripheral 130 right after the peripheral 130 is disconnected from the computer system 110, and disables related drivers and programs to prevent users from misusing a disconnected peripheral.

Figure 2:
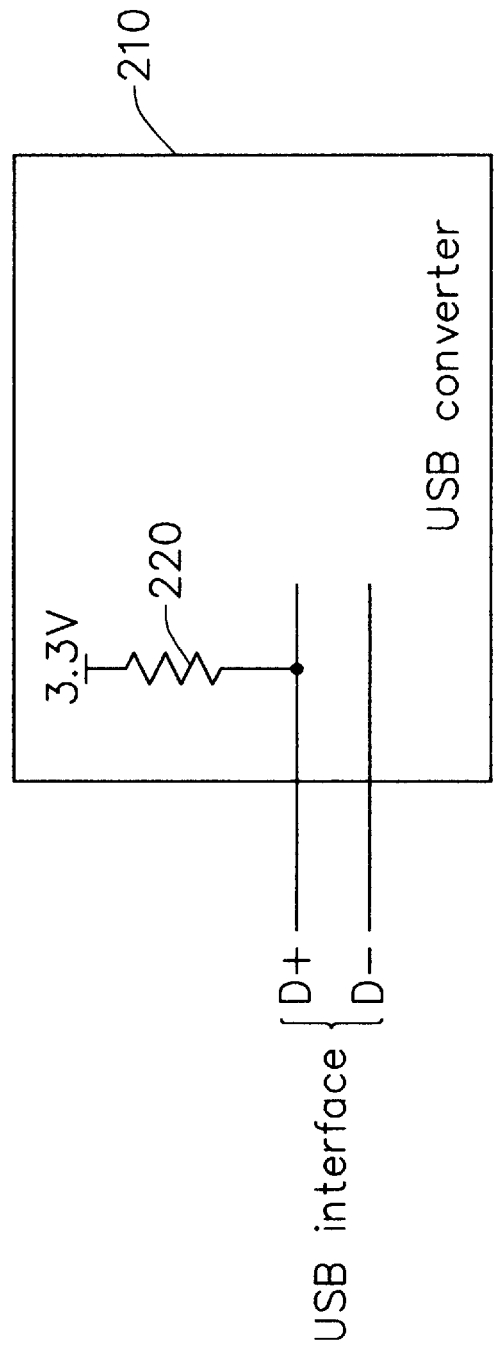
FIG. 2 is a schematic block diagram showing the connection of a detecting device of the USB interface according to the invention.

Referring to FIG. 2, a USB interface includes two transferring wires D+ and D−, wherein the D+ and D− are complementary to each other. The D+, the first transferring wire, is used to detect a connected high-speed peripheral, and the D−, the second transferring wire, is used to detect a connected low-speed peripheral. Within a peripheral 210, such as a high-speed peripheral, a pull-up resistor 220 connects the first transferring wire D+ of the USB interface to a voltage source of 3.3 volts. The peripheral 210 is either connected to or disconnected from the USB interface of a computer system, the voltage level of the first transferring wire D+ changes, and that tells the computer system the connection status of the peripheral 210. Therefore, by controlling the connection of the pull-up resistor 220, the converter according to the invention allows a computer system to detect the connection status of a peripheral, that is, the computer system is hot PnP.

Figure 3:
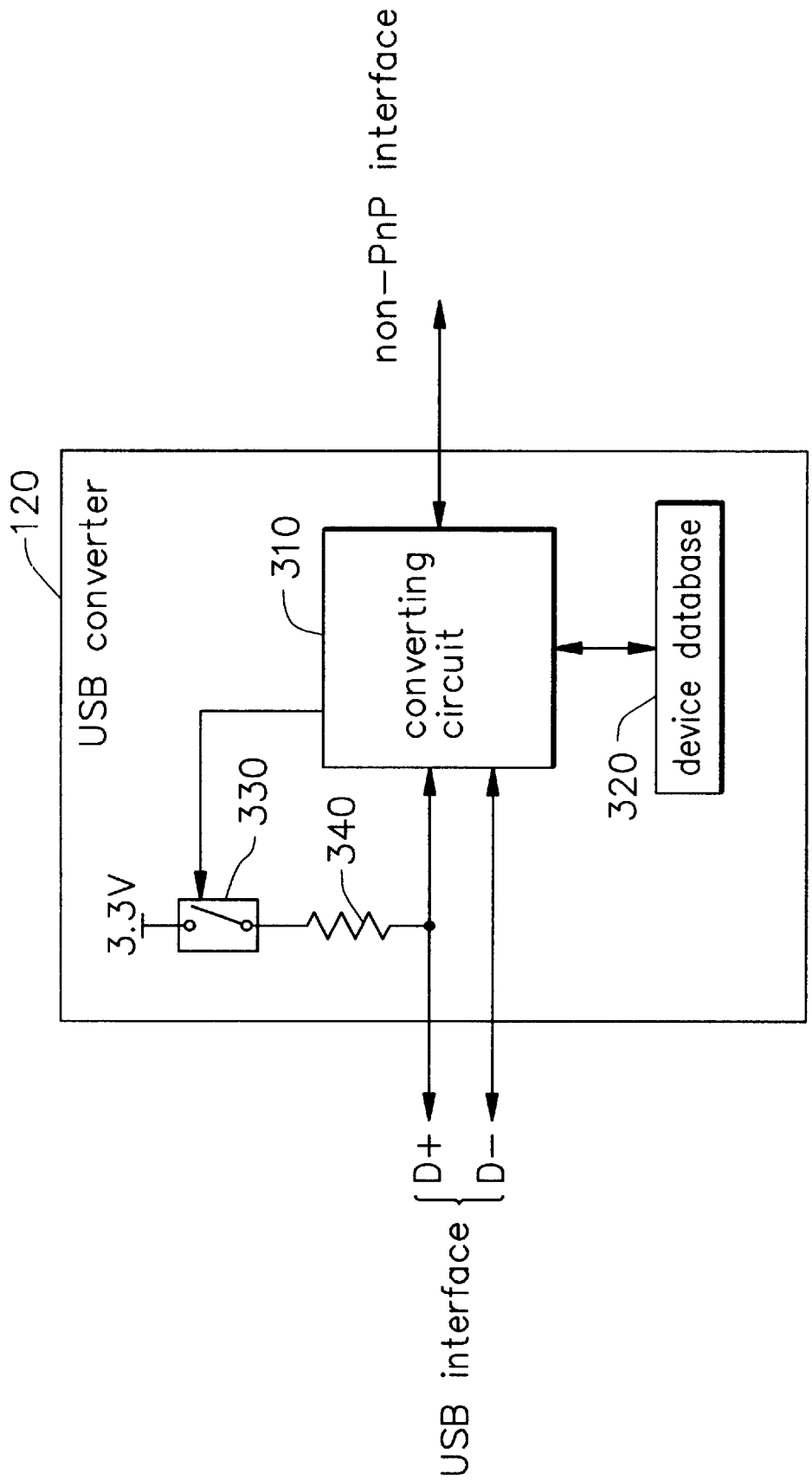
FIG. 3 is a schematic block diagram showing the USB converter according to the invention.

Referring to FIG. 3, a hot PnP USB converter 120 converts a non-PnP interface into a PnP USB interface, wherein the non-PnP interface used to connect a legacy peripheral, a peripheral without a USB interface, includes a parallel interface, an SCSI interface, or a serial interface.

The USB converter 120 includes a converting circuit 310, a device database 320, a switch 330, and a resistor 340. The converting circuit 310 is used to receive commands and messages from the computer system 110 through the USB interface, process those received commands and messages, convert the commands and messages into a non-PnP format, and send those converted commands and messages to the peripheral 130. Similarly, the converting circuit 310 can also convert the information from the peripheral 130 into a USB format, and send it back to the computer system 110.

The device database 320 stores related information of different possible non-PnP peripherals 130. When a non-PnP peripheral 130 is connected to the non-PnP interface of the USB converter 120, the converting circuit 310 picks up information related to the connected peripheral 130, such as the product ID, from the device database 320. And then, the converting circuit 310 sends the information to the computer system 110 connected to the UBS interface of the converter 120.

The resistor 340 connects the first transferring wire D+ and the voltage source of 3.3 volts to pull up the voltage of the first transferring wire D+. The switch 330 is controlled by the converting circuit 310 to determine the connection status of the pull-up resistor 340. When the switch 330 is opened, the pull-up resistor 340 is idle. The computer system 110 detects this change and determines that the converter 120 is disconnected from to the computer system 110. When the switch 330 is closed, the pull-up resistor 340 connects the first transferring wire to the voltage source of 3.3 volts, the computer system 110 also detects the changes and determines that the converter 120 is connected to the computer system 110 again. In the case that the peripheral 130 is either connected to or disconnected from the non-PnP interface of the converter 120, the converting circuit 310 opens and then closes the switch 330, which means the pull-up resistor is disconnected from the voltage source and then connected back to the voltage source. The voltage change activates the automatic detection of the computer system 110 to make the non-PnP peripheral hot PnP.

For example, when the converter 120 is connected to the computer system 110 alone, without the peripheral 130, only the information of the converter 120 is sent to the computer system 110, and then to the users. In this case, the converter 120 keeps frequently detecting the connection on its non-PnP interface. If a non-PnP peripheral 130 is connected to the non-PnP interface of the converter 120, the converting circuit 310 first opens the switch 330 to disconnect the pull-up resistor 340 from the voltage source, so that the computer system 110 treats the converter 120 as if it is disconnected from the computer system 110, and removes information related to the converter 120.

After a period of time, the converting circuit 310 closes the switch 330, so that the pull-up resistor 340 is connected to the voltage source again. The voltage change on the pull-up resistor 340 makes the computer system 110 treats the converter 120 as a newly connected peripheral, and sends a request for related information. Then, the converter 120 transfers information of the newly connected peripheral 130 to the computer system 110, and then to the users, so the users can use the peripheral 130. While the connection of the peripheral 130 and the converter 120 still exists, the converter 120 keeps monitoring existence of the connected peripheral.

If the converter 120 detects that the peripheral 130 is disconnected from the converter 120, it opens the switch 330 to disconnect the pull-up resistor 340 from the voltage source. As soon as the computer system 110 detects the voltage change on the pull-up resistor, it removes the information related to the peripheral 130, so the peripheral is no longer available to the users. The converter 120 now closes the switch 330 again, so that the pull-up resistor 340 is connected back to the voltage source. The computer system 110 asks for the information related to the converter 120 after it notices the voltage change on the pull-up resistor. By applying the foregoing detecting routine, a legacy, non-PnP peripheral can be connected to the USB interface of a computer system 110 through the converter 120, and works as a hot PnP peripheral.

Figure 4:
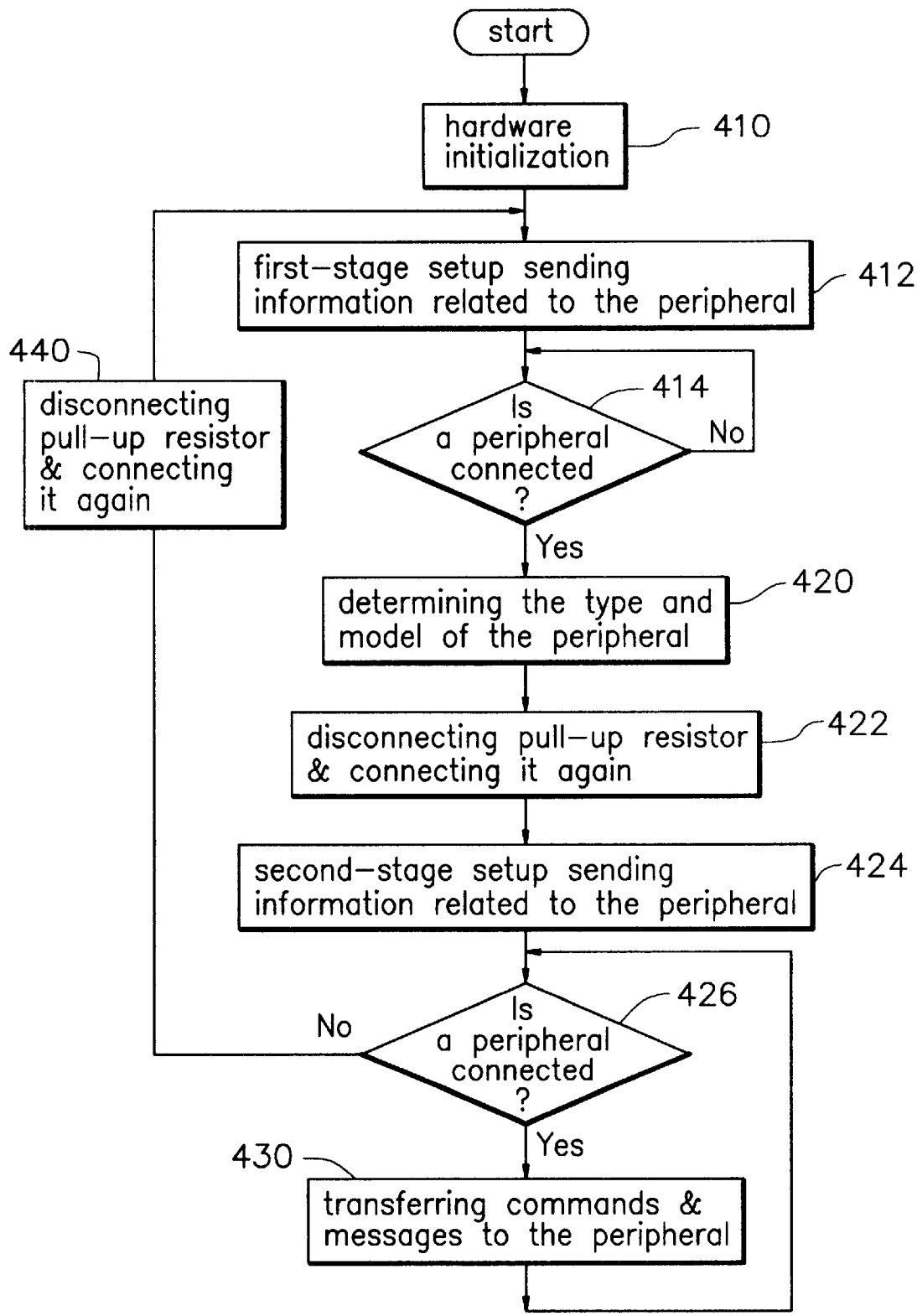
FIG. 4 is a flow chart showing the two-stage setup of the invention.
Figure 5:
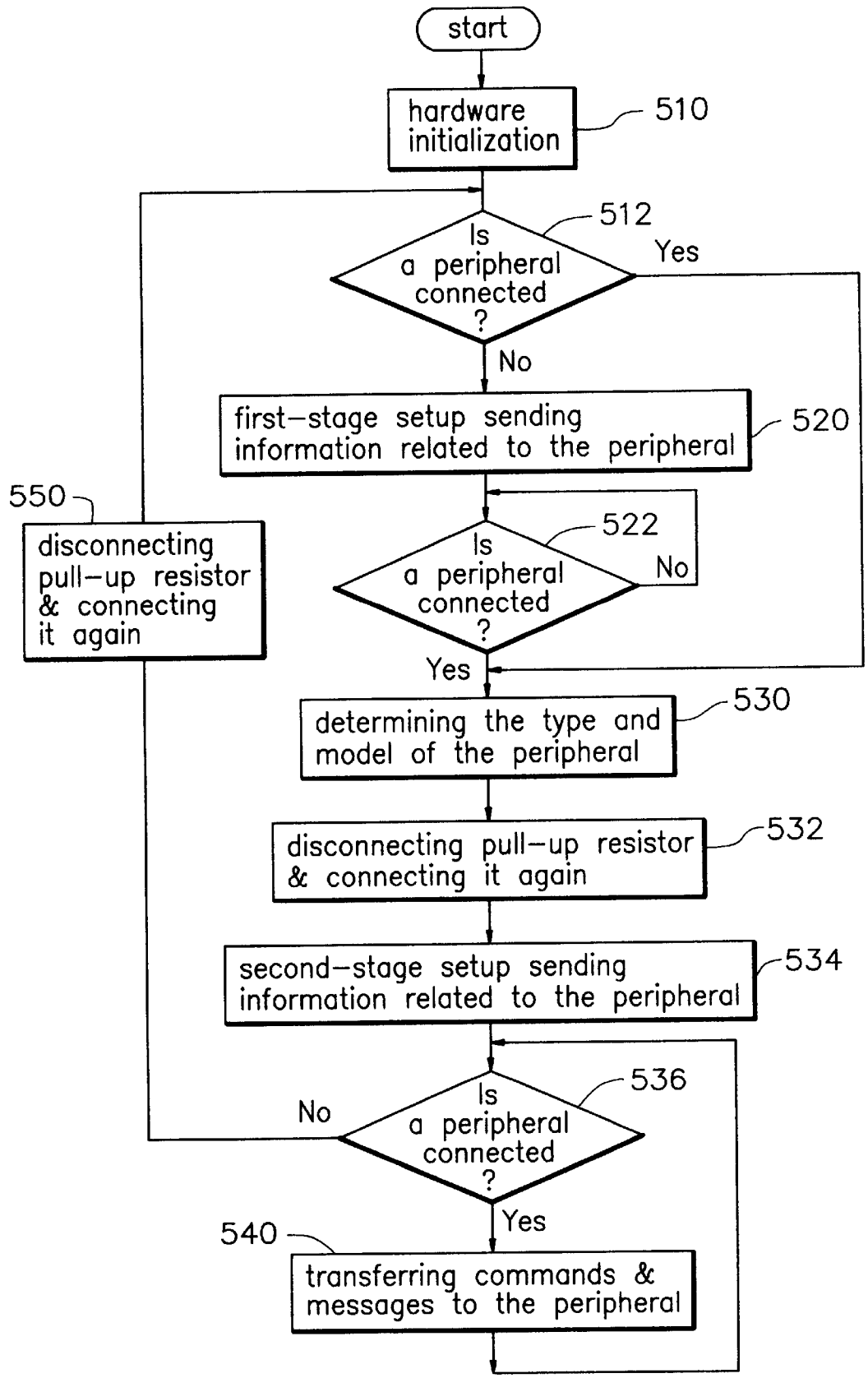
FIG. 5 is a flow chart showing the advanced setup of the invention.

The functionality of the converter 120 is further described by FIGS. 4 and 5, wherein the flow chart in FIG. 4 explains the configuration of the two-stage setup routine, and FIG. 5 explains the configuration of the advanced setup routine.

Referring to FIG. 4, step 410 represents the hardware initialization performed first after the converter 120 is activated. The following step, 412, is the beginning of the first-stage setup, which includes sending the information related to the converter 120 to the computer system 110.

Step 414 detects the presence of a peripheral on the non-PnP interface of the converter 120. Detection continues until a peripheral is found. If a non-PnP peripheral 130 is found connected to the non-PnP interface of the converter 120, the routine moves to step 420.

In step 420, the converting circuit 310 searches the device database 320 to obtain information regarding the connected peripheral 130 according to the detected result.

After the information regarding the connected peripheral 130 is determined, the converter 120 first disconnects the pull-up resistor 340 from the voltage source for a period of time, and then connects the pull-up resistor 340 back to the voltage source. In this manner, the computer system 110 is able to detect voltage change on the pull-up resistor 340, in step 422.

Step 424 is the beginning of the second-stage setup, in which information related to the connected peripheral 130 is sent to the computer system 110.

In step 426, the converter 120 keeps monitoring the presence of the peripheral 130.

In step 430, the converter 120 transfers commands and messages for the computer system 110 and the peripheral 130 in the case that the peripheral 130 is still connected to the non-PnP interface of the converter 120. Then, the routine moves back to step 426 again, so the converter 120 can keep monitoring the connection of the peripheral 130.

If the peripheral 130 is disconnected from the non-PnP interface of the converter 120, the routine moves to step 440. In order to warn the computer system 110 about the absence of the peripheral 130, the converter 120 opens the switches 330 to disconnect the pull-up resistor 340 from the voltage source for a period of time, and then closes the switch 330 to connect the pull-up resistor 340 back to the voltage source. After that, the routine moves back to step 412 to start the first-stage setup again.

The following descriptions refer to FIG. 5, in which the routine of an advanced setup is described.

Step 510 represents the hardware initialization performed first after the converter 120 is activated. In the following step 512, the converter 120 detects the presence of a peripheral on the non-PnP interface of the converter 120. If a peripheral is present, the routine moves to step 530, if not, then the routine moves to the next step, step 520.

If a peripheral is not found on the non-PnP interface of the converter 120, then, step 520 is executed to perform the first-stage setup, starting with sending the information related to the converter 120 to the computer system 110.

Step 522 keeps detecting the non-PnP interface of the converter 120 until a peripheral is found.

In step 530, if a peripheral 130 is found connected to the non-PnP interface of the converter 120, the converting circuit 310 searches the device database 320 to determine the information of the connected peripheral 130 according to the detected result.

After the information related to the connected peripheral 130 is determined, the converter 120 first disconnects the pull-up resistor 340 from the voltage source for a period of time, and connects the pull-up resistor 340 back to the voltage source, so that the computer system 110 is able to detect voltage change on the pull-up resistor 340, in step 532.

Step 534 is the beginning of the second-stage setup including sending the information related to the connected peripheral 130 to the computer system 110.

In step 536, the converter 120 keeps monitoring the presence of the peripheral 130.

In step 540, the converter 120 transfers commands and messages for the computer system 110 and the peripheral 130 in the case that the peripheral 130 is still connected to the non-PnP interface of the converter 120. Then, the routine moves back to step 536 again, so the converter 120 can keep monitoring the connection of the peripheral 130.

If the peripheral 130 is disconnected from the non-PnP interface of the converter 120, the routine moves to step 550. In order to inform the computer system 110 that the peripheral 130 is disconnected from the converter 120, the converter 120 opens the switches 330 to disconnect the pull-up resistor 340 from the voltage source for a period of time, and then closes the switch 330 to connect the pull-up resistor 340 back to the voltage source. After that, the routine moves back to step 512 to start the first-stage setup again.

The two-stage setup routine always checks if there is a peripheral connected after the first-stage setup. If there are no peripherals connected, the setup routine moves to the second-stage setup. On the other hand, the advanced setup routine checks if there is a peripheral connected before the first-stage setup. If there is a peripheral connected, the setup routine move directly to the second-stage setup. Either the two-stage setup or the advanced setup can turn a non-PnP peripheral into a hot PnP one, with different procedures.

Figure 6:
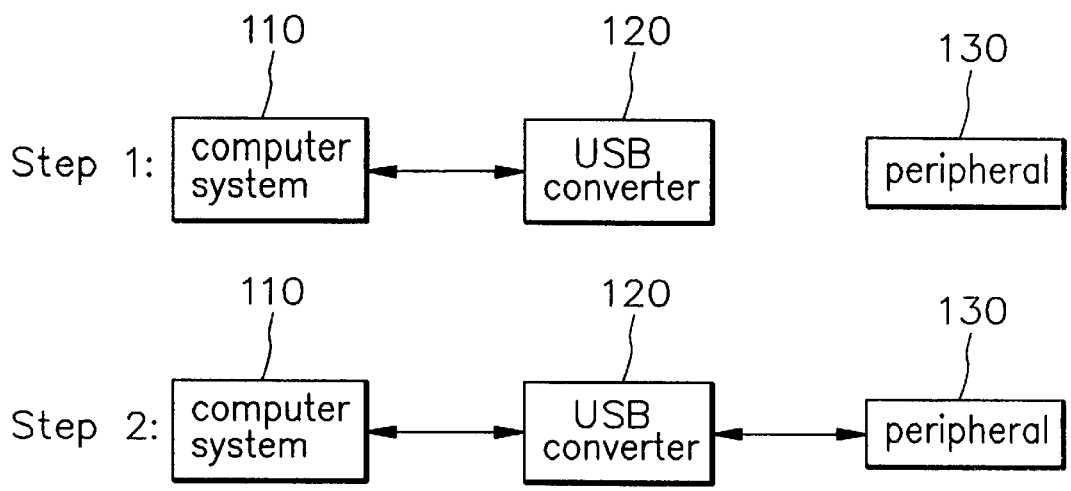
FIG. 6 is a schematic diagram showing a first combination of the invention.
Figure 7:
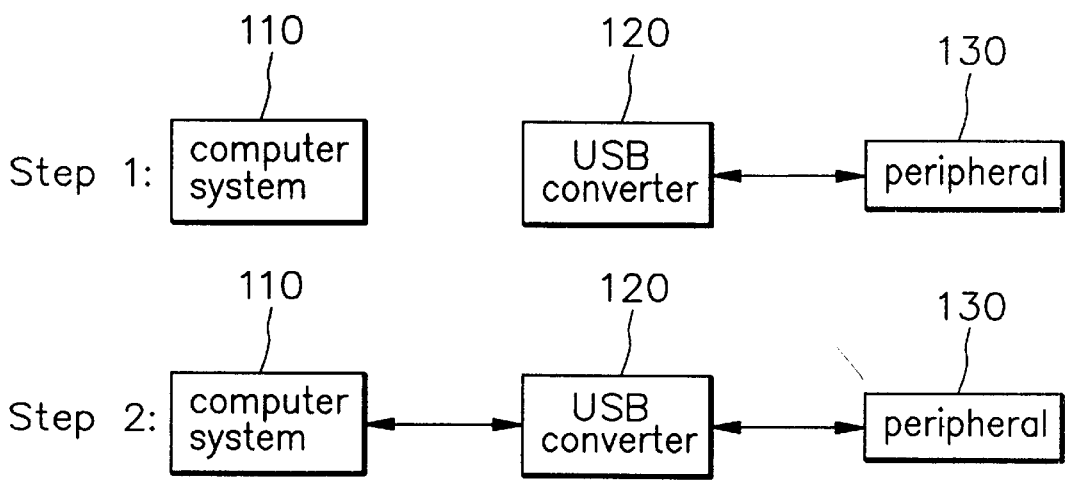
FIG. 7 is a schematic diagram showing a second combination of the invention.
Figure 8:
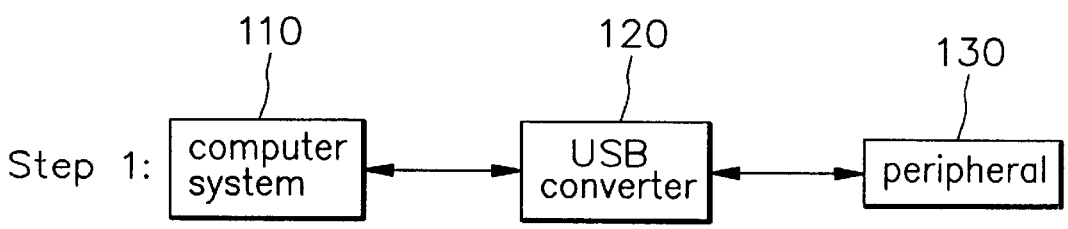
FIG. 8 is a schematic diagram showing a third combination of the invention.

FIGS. 6 through 8, show several different possibilities for the connection between the converter 120 and a non-PnP peripheral 130.

In FIG. 6, only the converter 120 is connected to the computer system 110 in Step 1, the computer system 110 detects the converter 120 and installs drivers and programs related to the converter 120. In Step 2, the peripheral 130 is connected to the non-PnP interface of the converter 120. The converter 120 checks on the type and model of the connected peripheral 130, and then notifies the computer system 110, so that the computer system 1 10 removes the drivers and programs related to the previous connected device and installs the ones related to the newly connected peripheral 130.

In FIG. 7, the peripheral 130 is first connected to the converter 120 in Step 1. The converter 120 detects the peripheral 130 and finds out the information related to the connected peripheral 130. In Step 2, the converter 120 is then connected to the computer system 110. The computer system 110 now detects peripheral 130 and installs it.

In FIG. 8, the computer system 110, the converter 120, and the peripheral 130 are all connected in Step 1. The converter 120 determines the type and model of the peripheral 130, and then the computer system detects the peripheral 130 and installs it.

According to the foregoing, the USB converter according to the invention turns a legacy, non-PnP peripheral into a hot PnP peripheral. It is not necessary to reboot the computer system to detect and install a peripheral after the peripheral is connected to the computer system through the USB converter. In this manner, a legacy, non-PnP peripheral works as a hot PnP peripheral with a USB interface.

Compared with a conventional converter, the hot PnP converter of a USB interface according to the invention includes the following advantages:

1. The converter according to the invention doesn't only convert a legacy interface into a USB interface and show the information related to the converter on the computer system, it also shows the information related to the connected peripheral on the computer system. The users can control and monitor the status of a connected peripheral more directly.

2. The converter according to the invention is hot PnP. By changing the voltage on the pull-up resistor of the signal line on the USB interface, the converter instructs the computer system to detect the connection of a peripheral automatically, and then adds or removes drivers and programs related to the peripheral. In this manner, the converter can prevent the users from executing improper programs to ensure the function of a computer system. Furthermore, the converter is more compatible.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A hot plug-and-play converter of a universal serial bus interface for converting a peripheral interface into a plug-and-play universal serial bus interface, wherein the peripheral interface is used to connect a peripheral, the converter comprising:

a switch, wherein a first end of the switch is connected to a voltage source;

a resistor for connecting a transferring wire of the universal serial bus interface and a second end of the switch; and a converting circuit for connecting the universal serial bus interface and the peripheral interface, transferring signals between the universal serial bus interface and the peripheral interface, and sending a controlling signal to control the connection of the first end and the second end of the switch, wherein the controlling signal opens the switch for a period of time and then closes the switch after the peripheral interface is connected to the universal serial bus interface, and the controlling signal opens the switch for a period of time and then closes the switch after the peripheral interface is disconnected from the universal serial bus interface.

2. The converter of claim 1, wherein the converter further comprises a device database connected to the converting circuit for storing information regarding peripherals.

3. The converter of claim 1, wherein the transferring wire detects a high-speed peripheral.

4. The converter of claim 1, wherein the universal serial bus interface further comprises a second transferring wire for detecting a low-speed peripheral.

5. The converter of claim 1, wherein the universal serial bus interface connects to a computer system.

6. A controlling routine of a hot plug-and-play converter of a universal serial bus interface, the routine comprising:

providing a peripheral interface for connecting a peripheral;

providing a hot plug-and-play universal serial bus interface for connecting a computer system, wherein the universal serial bus interface comprises a first transferring wire;

connecting the first transferring wire to a voltage source;

disconnecting the first transferring wire from the voltage source for a period of time, and then connecting the first transferring wire back to the voltage source after the peripheral is connected to the peripheral interface; and disconnecting the first transferring wire from the voltage source for a period of time, and then connecting the first transferring wire back to the voltage source after the peripheral is disconnected from the peripheral interface.

7. A controlling routine of a hot plug-and-play converter of a universal serial bus interface, the routine comprising:

providing a peripheral interface for connecting a peripheral;

providing a hot plug-and-play universal serial bus interface for connecting a computer system, wherein the universal serial bus interface comprises a first transferring wire;

providing a resistor for connecting the first transferring wire to a voltage source;

performing a first-stage setup to send information related to the converter to the computer system;

checking the connection of the peripheral interface and the peripheral, wherein in the case where the peripheral is not connected to the peripheral interface, the checking continues until the connection of the peripheral and the peripheral interface is found;

determining a type and a model of the peripheral;

disconnecting the resistor from the first transferring wire for a period of time and then connecting the resistor back to the first transferring wire;

performing a second-stage setup to send information related to the peripheral to the computer system;

performing a main loop to check the connection between the peripheral interface and the peripheral;

in the case where the connection doesn't exist, disconnecting the resistor from the first transferring wire for a period of time and then connecting the resistor back to the first transferring wire and then performing the first-stage setup;

in the case where the connection exists, sending commands from the computer to the peripheral; and performing the main loop.

8. A controlling routine of a hot plug-and-play converter of a universal serial bus interface, the routine comprising:

providing a peripheral interface for connecting a peripheral;

providing a hot plug-and-play universal serial bus interface for connecting a computer system, wherein the universal serial bus interface comprises a first transferring wire;

providing a resistor for connecting the first transferring wire to a voltage source;

performing a first detection on the presence of a connection between the peripheral interface and the peripheral;

in the case where the connection doesn't exist, performing a first-stage setup to send information related to the converter to the computer system;

performing a second detection to check the connection of the peripheral interface and the peripheral, wherein in the case where the peripheral is not connected to the peripheral interface, checking continues until the connection of the peripheral and the peripheral interface is found;

in the case that either a result of the first detection or a result of the second detection shows the connection, performing:

determination of a type and a model of the peripheral;

a second-stage setup to send information related to the peripheral to the computer system; and performance of a main loop to check the connection between the peripheral interface and the peripheral;

in the case where the connection doesn't exist, disconnecting the resistor from the first transferring wire for a period of time and then connecting the resistor back to the first transferring wire, and then performing the first-stage setup;

in the case where the connection exists, sending commands from the computer to the peripheral; and performing the main loop.

* * * * *